(12) United States Patent
Meschenmoser et al.

(10) Patent No.: US 9,310,521 B2
(45) Date of Patent: Apr. 12, 2016

(54) SPECTACLE LENS SEMI-FINISHED PRODUCT OR SPECTACLE LENS FINISHED PRODUCT AND METHOD OF MAKING THE SAME

(71) Applicant: Carl Zeiss Vision International GmbH, Aalen (DE)

(72) Inventors: Ralf Meschenmoser, Essingen (DE); Karl-Heinz Winter, Essingen (DE); Ralf Gorosics, Gussenstadt (DE)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 14/479,611

(22) Filed: Sep. 8, 2014

(65) Prior Publication Data
US 2015/0153481 A1    Jun. 4, 2015

(30) Foreign Application Priority Data
Sep. 11, 2013 (DE) .......................... 10 2013 218 136

(51) Int. Cl.
| | |
|---|---|
| *B24B 9/14* | (2006.01) |
| *G02B 1/04* | (2006.01) |
| *B29D 11/00* | (2006.01) |
| *G02C 7/02* | (2006.01) |
| *B23C 3/00* | (2006.01) |

(52) U.S. Cl.
CPC . *G02B 1/041* (2013.01); *B23C 3/00* (2013.01); *B29D 11/00009* (2013.01); *B29D 11/00865* (2013.01); *G02C 7/02* (2013.01); *Y10T 409/303752* (2015.01)

(58) Field of Classification Search
CPC .................................. G02B 1/04; G02B 1/041
USPC ................................... 351/41; 451/42, 43, 44
See application file for complete search history.

(56) References Cited

U.S. PATENT DOCUMENTS

| | | | |
|---|---|---|---|
| 3,528,326 A | 9/1970 | Kilmer et al. | |
| 4,300,821 A | 11/1981 | Mignen | |
| 4,693,446 A | 9/1987 | Orlosky | |
| 4,997,268 A | 3/1991 | Dauvergne | |
| 5,149,337 A * | 9/1992 | Watanabe ............... | B24B 13/00 451/255 |
| 5,161,333 A * | 11/1992 | Lecerf .................... | B24B 49/18 451/21 |

(Continued)

FOREIGN PATENT DOCUMENTS

| | | |
|---|---|---|
| EP | 0 955 147 A1 | 11/1999 |
| JP | 2008-191186 A | 8/2008 |
| JP | 2009-241156 A | 10/2009 |

OTHER PUBLICATIONS

English translation and search report of the European Patent Office dated Mar. 10, 2015 in corresponding European patent application 14184005.8-1703 and European patent 2848395.

(Continued)

*Primary Examiner* — Hung Dang
(74) *Attorney, Agent, or Firm* — Walter Ottesen P.A.

(57) ABSTRACT

The invention relates to a spectacle lens semi-finished or finished product with a front surface, a rear surface, a cylinder rim surface, a front edge surface with a front surface transition to the front surface and a front cylinder rim surface transition to the cylinder rim surface and/or a rear edge surface with a rear surface transition to the rear surface and a rear cylinder rim surface transition to the cylinder rim surface. The front surface transition is formed as a rounding and/or the rear surface transition is formed as a rounding.

13 Claims, 11 Drawing Sheets

(56) References Cited

U.S. PATENT DOCUMENTS

| | | | |
|---|---|---|---|
| 5,964,647 | A | 10/1999 | Henky |
| 5,975,875 | A | 11/1999 | Crowe, Jr. et al. |
| 6,103,148 | A | 8/2000 | Su et al. |
| 6,523,443 | B1 | 2/2003 | Hof et al. |
| 2013/0022739 | A1 | 1/2013 | Biteau et al. |

OTHER PUBLICATIONS

Diepes, H. et al, "Optik und Technik der Brille", Optische Fachveroeffentlichung GmbH, Heidelberg, Germany, 2002, pp. 556, 559 to 560 and English translation.

Mister Spex, "Edging", http://misterspex.de/glossar/einschleifen.html, downloaded Apr. 20, 2015. One page and English translation.

English translation and Office action of the German Patent Office dated Jul. 29, 2014 in German patent application 10 2013 218 136.1 on which the claim of priority is based.

English translation of "Division of manufacturing processes according to DIN 8580", downloaded on Jul. 14, 2015, two pages, http://www.fachwissen-technik.de/verfahren/fertigungsverfahren.html.

Clifford W. Brooks, "Essentials of Ophthalmic Lens Finishing Second Edition", Published 2003 by Butterworth Heinemann/Elsevier in St. Louis, Missouri; pp. 166, 192-199, 206-209, 257, 267 and 269.

* cited by examiner

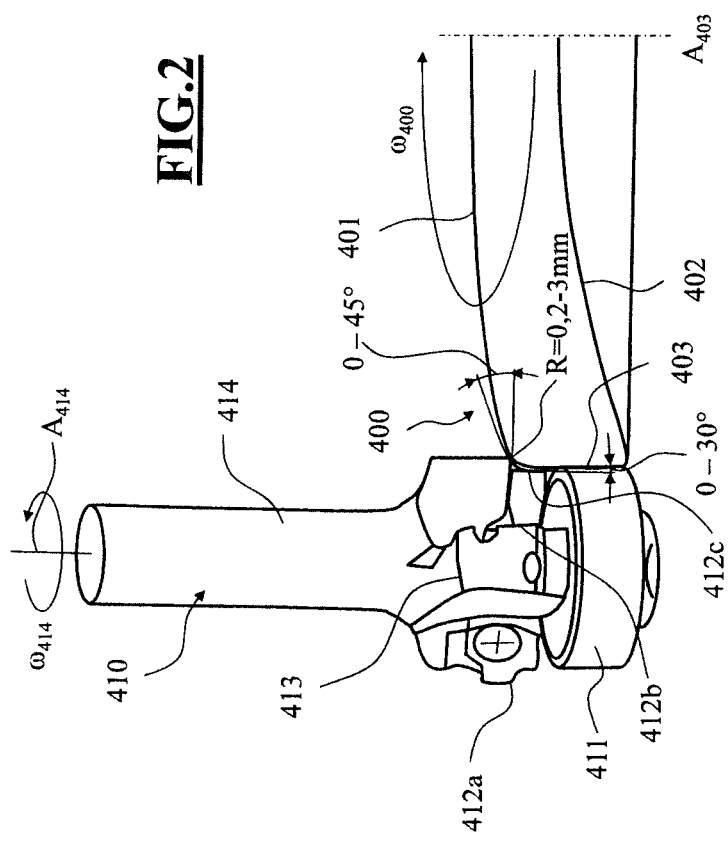

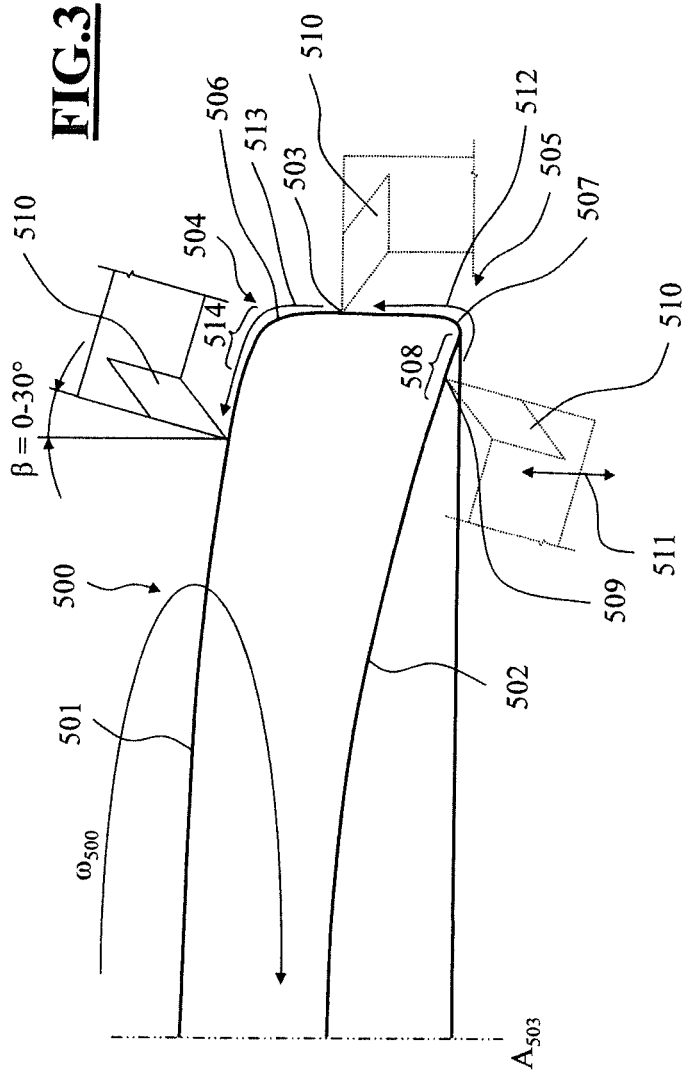

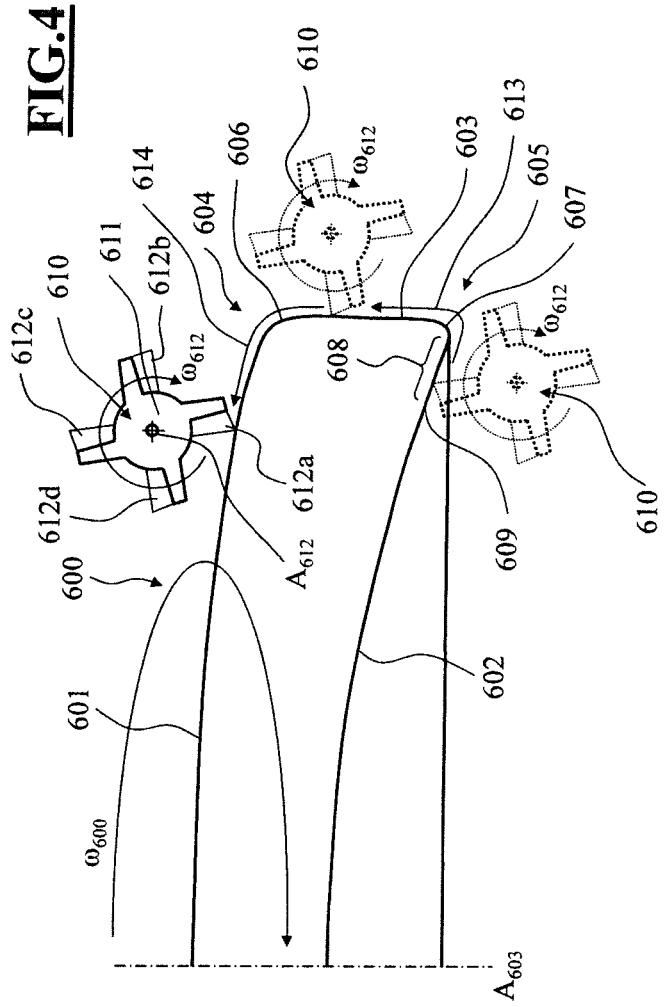

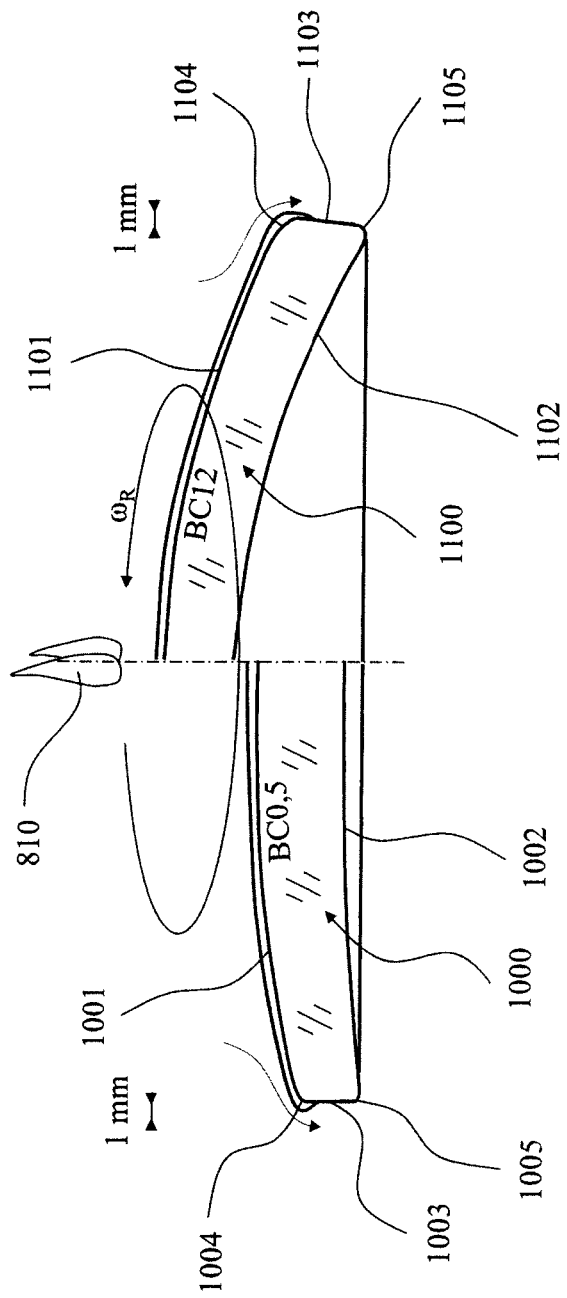

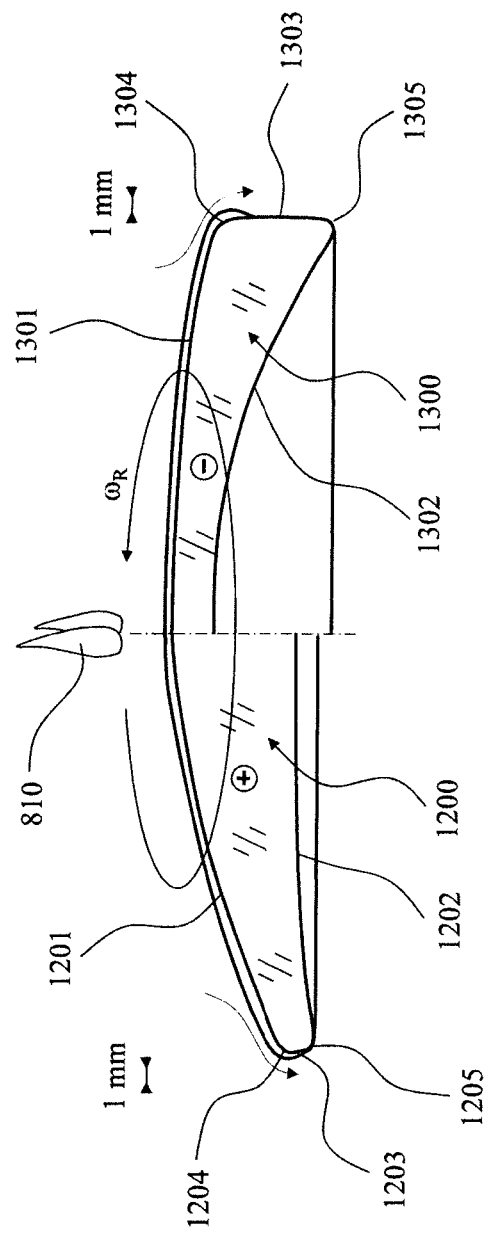

SPECTACLE LENS SEMI-FINISHED PRODUCT OR SPECTACLE LENS FINISHED PRODUCT AND METHOD OF MAKING THE SAME

CROSS REFERENCE TO RELATED APPLICATION

This application claims priority of German patent application no. 10 2013 218 136.1, filed Sep. 11, 2013, the entire content of which is incorporated herein by reference.

BACKGROUND OF THE INVENTION

A distinction is made between spectacle lens semi-finished products and spectacle lens finished products. Semi-finished products is the term used in the production business for partially finished preliminary products, which a company either puts in store for processing later itself or passes on to other companies to complete production. Spectacle lens semi-finished products are lens blanks with only one optically finished surface (cf. Heinz Diepes, Rolf Blendowske "Optik and Technik der Brille" [spectacle optics and technology], Optische Fachveröffentlichung GmbH, Heidelberg, 2002, page 560). Finished products is the term used for products that are finished and ready for sale, which a company either delivers immediately or puts in its own store for sale later. Spectacle lens finished products or finished spectacle lenses are spectacle lenses with two optically finished optical surfaces. These may or may not be rimmed at the ends (cf. ibidem, page 559). A rimmed spectacle lens is accordingly a finished spectacle lens that has been brought to the final size and shape by working the rim (cf. ibidem, page 559).

Also often used to describe unfinished spectacle lenses is the term blanks. Blanks are usually preformed pieces of material for making spectacle lenses in some state or other before completion of the surface finishing (cf. ibidem; page 556). The term semi-finished blanks is a synonym for the term semi-finished products.

Spectacle lens semi-finished products and spectacle lens finished products have optical surfaces intended for a spectacle wearer, in each case one for arrangement on the object side and one for arrangement on the opposite, eye side, and a surface keeping these surfaces apart. The optical surface intended for arrangement on the object side is referred to as the front surface, the optical surface intended for arrangement on the eye side is referred to as the rear surface. The surface lying in between, either directly forming an edge or indirectly adjoining by way of an edge surface at one end the front side and at the other end the rear side, is referred to as the cylinder rim surface.

While in the past spectacle lenses were predominantly made from mineral glasses, in particular crown glasses (Abbe number>55) and flint glasses (Abbe number<50), in the meantime spectacle lenses of a large number of organic materials are available.

At present, spectacle lens semi-finished or finished products with spherical, aspherical or progressive front surfaces are cast in mass production processes by means of front- and rear-surface molding shells and a sealing ring, as described for example in the documents U.S. Pat. No. 4,300,821, U.S. Pat. No. 6,103,148 A or JP 2008 191186 A. This applies to materials with the trade names MR-7, MR-8, MR-10 and CR-39/CR-607 and others. The materials with the trade names MR-7, MR-8, MR-10 are polythiourethanes, which are sold by the company Mitsui Chemicals. The abbreviation "MR" stands here for Mitsui Resin. CR-39/CR-607/CR-630 are low-refractive-index materials, with a refractive index of 1.50, which are sold by the company PPG Industries. The materials CR-607 and CR-630 are used for example for photochromic applications.

Semi-finished products of finished products for spectacle lenses of polycarbonate are produced in metal molds by means of an injection-molding technique. This method of making them is described for example in EP 0955147 A1.

Order-specific prescription spectacle lenses, i.e. in particular individualized single-vision and multifocal lenses and in particular variable-focus or progressive lenses, are brought into their final form by mechanical processes. The outer forms may be formed here as round, oval or arbitrary, describing so-called freeforms.

The semi-finished or finished products described above are often subjected to one or more refinement processes. In particular, functional layers are applied on one or both sides. Such functional layers are layers that provide the spectacle lenses with properties which are predetermined and advantageous for the spectacle wearer and which the spectacle lenses would not have just on the basis of their material properties and shaping. Apart from optical properties, such as for example antireflective or reflective coating, light polarization, coloring, etc., such advantageous properties are also mechanical properties, such as hardening, reducing the adherence of dirt or misting, etc., and/or electrical properties, such as shielding from electromagnetic radiation, conduction of electrical current, etc., and/or other physical or chemical properties.

The application of functional layers often takes place with the aid of wet coating processes. In production technology, coating is understood as meaning a main group of production processes conforming to DIN 8580, which are used for applying a firmly adhering layer of formless substance to the surface of a workpiece. Wet coating processes are such coating processes in which the initial state of the coating material is liquid. In the case of spectacle lens production, dip coating processes and spin coating processes in particular are of special importance.

In dip coating processes, to apply the coating spectacle lenses (semi-finished or finished products) are usually pulled out of the dipping bath linearly in the direction of the normal to the front or rear surfaces. In this case, the running off behavior of the coating produces accumulations of coating at the lowest point. If, in addition, a supporting element, such as for example a retention spring, or an adhesive location also affects the running-off behavior of the coating there, the accumulation of coating on the optical surface becomes up to 3 to 4 mm larger. The accumulation of coating reduces the useful optical surface area and/or may lead to rejection for cosmetic reasons.

In spin coating processes, spectacle lenses (semi-finished or finished products) are wetted with coating. The application of the coating is performed for example by means of a metering pin or by horizontal or inclined dipping in a container filled with coating. For even distribution of the coating layer, the optical lenses are rotated at a sufficient speed and the coating is spun off. In the process, a residual amount of coating collects at the transition between the optical surface and the cylinder rim surface and forms a peripheral fringe of coating. The accumulation of coating reduces the usable optical surface area and/or may lead to rejection for cosmetic reasons.

With supporting gas processes, for example flooding with nitrogen during the curing of the coating, turbulences may occur at the transition, and in turn cause structures to form from the coating, which may for example take the form of serrations.

Depending on how the process is conducted, defects such as for example gas bubbles, may form in the coating layer while spin and dip coating processes are being carried out. With linear pulling out or spinning off, these bubbles may attach themselves at the transition between the optical surface and the cylinder rim surface and lead directly to rejection.

When curing the coating applied for example by means of a spin and/or dip coating process, differences in stress may occur. These may lead to cracks in the coating.

SUMMARY OF THE INVENTION

The object of the invention is therefore to provide a spectacle lens semi-finished or finished product with greater production tolerance than a conventional wet coating process. Furthermore, the object of the invention is to provide a method of making such a spectacle lens semi-finished or finished product. Finally, the object of the invention is also to provide a method of coating a spectacle lens semi-finished or finished product with greater production tolerance.

This object is achieved by a spectacle lens semi-finished product or a spectacle lens finished product with the features of the invention, a method of making a spectacle lens semi-finished product or a spectacle lens finished product with the features of the invention and also a method of coating a spectacle lens semi-finished product or spectacle lens finished product with the features of the invention.

The inventors have established that conventional spectacle lens semi-finished or finished products have either an edge or a bevel between the cylinder rim surface and the optically effective front or rear surfaces. An edge refers generally to a line in which two surfaces (here the cylinder rim surface and the front surface on the one hand and the cylinder rim surface and the rear surface on the other hand) abut one another. A bevel is a beveled surface which is created at an edge of a workpiece (here the cylinder rim surface and the front surface on the one hand and the cylinder rim surface and the rear surface on the other hand).

In both product stages, the semi-finished product or the finished product, transitions between the optical surface and the cylinder rim are beveled with a sharp edge or straight. In the case of many wet-chemical refining processes, this produces a breakaway edge with the effects described above. In particular, more detailed investigations of dip coating processes and spin coating processes have shown that the coating substance intended for the application of the coating cannot run off sufficiently on or over the cylinder rim, since the transition with an edge forms a run-off barrier. These results can be applied to all kinds of wet coating processes.

Starting from a spectacle lens semi-finished or finished product with a front surface, a rear surface, a cylinder rim surface, a front edge surface with a front surface transition to the front surface and a front cylinder rim surface transition to the cylinder rim surface and/or a rear edge surface with a rear surface transition to the rear surface and a rear cylinder rim surface transition to the cylinder rim surface, the invention provides that the front surface transition is formed as a rounding and/or that the rear surface transition is formed as a rounding.

An edge surface means here the surface that connects the respective optical surfaces (irrespective of their processing state). Rounding is understood as meaning a rounded smoothing in the transitional region that runs steadily and without any inflection.

This curved transition is conducive to the run-off behavior in the case of a dip coating process so positively that no accumulation of coating remains on the optical surface and the usable diameter becomes greater than when using semi-finished or finished products of a conventional form.

In the case of a spin coating process, the radial transition is conducive to the spinning-off behavior so positively that rotational speeds can be increased by a multiple and no breakaway of coating (flying droplets) occurs, but instead the accumulation of coating is transported smoothly to the radial transition and the cylinder rim. Less or no accumulation of coating is left on the optical surface and the usable diameter becomes greater in comparison with the use of a conventional semi-finished or finished product.

In the case of supporting gas processes, such as for example flooding with nitrogen during the curing of the coating, the radial transition formed by the rounding is conducive to the flushing with gas in the form that a laminar flow of the gas is produced at the transition between the optically active surface and the cylinder rim surface and the structures causing rejection are eliminated.

The radial transition also no longer offers any barriers for defects, for example bubbles. These can run off unhindered in the case of a dip coating process or be spun off in the case of a spin coating process.

The radial transition has the effect of minimizing the fringe of coating on the optically active surface. This leads to more uniform layer thicknesses and to drastically reduced stresses, which in turn however no longer have an edge of penetration. The defect is eliminated.

It has been found to be favorable with respect to achieving the above effects in the case of wet coating if the rounding of the front surface transition has a radius of curvature which is greater than 0.2 mm, in particular greater than 0.3 mm, more particularly greater than 0.5 mm, preferably greater than 1 mm, and/or if the rounding of the rear surface transition has a radius of curvature which is greater than 0.2 mm, in particular greater than 0.3 mm, more particularly greater than 0.5 mm, preferably greater than 1 mm.

The circle of curvature (also referred to as the osculating circle) at a specific point of a plane curve is the circle that best approximates the curve at this point. The center point of the circle of curvature is known as the center point of curvature. Its radius, the radius of curvature, is the reciprocal of the curvature of the curve at this point. Its tangent at this point coincides with the tangent of the curve. Since the curvature of a curve generally varies locally, the curve generally only osculates the circle of curvature in an infinitesimally small segment.

The radius of curvature of the rounding respectively refers to the radius of curvature of the rounding in a plane through the center axis passing through the center of gravity of the semi-finished or finished product at the point of intersection of this plane through this axis with the edge or line between the respective optical surface (front surface or rear surface) and the cylinder rim surface. There are therefore a large number of radii of curvature along this edge which advantageously satisfy all of the condition(s) specified above.

Furthermore, it is desirable if the rounding of the front surface transition has a radius of curvature which is less than 5 mm, in particular less than 3 mm, more particularly less than 2.5 mm, preferably less than 2 mm, and/or if the rounding of the rear surface transition has a radius of curvature which is less than 5 mm, in particular less than 3 mm, more particularly less than 2.5 mm, preferably less than 2 mm. This achieves the effect that the breakaway of coating is prevented with a sufficiently high degree of certainty.

It has been found to be very favorable if the rounding has a radius of curvature in the range between 0.2 mm and 3 mm, possibly in the range between 0.5 mm and 3 mm.

The rounding of the front surface transition may extend over an angle—measured with respect to the center point of curvature, defined above, starting from the point on the edge between the front surface and the edge surface—which is greater than 15°, in particular greater than 20°, more particularly greater than 25°, preferably greater than 30°. These angle ranges for the rounding in the region of the front surface transition have proven to be sufficient to ensure a contiguous liquid film of coating in the case of the wet coating process. The curvature running in the same direction of the convexly curved front surface also has a conducive effect.

The rounding of the rear surface transition may extend over an angle—measured with respect to the center point of curvature, defined above, starting from the point on the edge between the rear surface and the edge surface—which is greater than 25°, in particular greater than 30°, more particularly greater than 35°, preferably greater than 40°. On account of the opposing curvature of the concavely curved rear surface, to avoid a breakaway of the film of coating it may under some circumstances even be necessary to choose the angle range greater than that of the rounding of the front surface transition.

The form of the rounding may in cross section describe a portion of a circle, an ellipse or a parabola. All that is important is the stepless and smooth transition of the optically active surface to the edge surface. The transition at the cylinder rim is of secondary importance, but should if possible also be stepless and without any inflection.

For this reason, the invention provides in a further refinement that the front cylinder rim surface transition is formed as a rounding and/or that the rear cylinder rim surface transition is formed as a rounding. This measure has the effect in the case of wet coating of inhibiting the breakaway of coating, but not to the same extent as the roundings in the region of the optical surfaces.

The corresponding method according to the invention of making a spectacle lens semi-finished or finished product with a front surface, a rear surface, a cylinder rim surface, a front edge surface with a front surface transition to the front surface and a front cylinder rim surface transition to the rear rim surface and/or a rear edge surface with a rear surface transition to the rear surface and a rear cylinder rim surface transition to the cylinder rim surface is characterized in that the front surface transition is provided with a rounding and/or in that the rear surface transition is provided with a rounding.

The object described above is achieved to the full extent by the refinement according to the invention of the method.

For the reasons specified above, it is advantageous if the front cylinder rim surface transition is also provided with a rounding and/or if the rear cylinder rim surface transition is also provided with a rounding.

The rounding of the front surface transition and/or the rounding of the rear surface transition and possibly the rounding of the front and/or rear cylinder rim surface transition may for example be cast on. This may take place already during the casting of the spectacle lens semi-finished or finished product by using molding shells or by using the injection-molding process. The rounding of the front surface transition and/or the rounding of the rear surface transition may also be produced with a cutting tool. The cutting tool may for example be a milling tool.

The corresponding rounding(s) may be produced in conjunction with the surface-working process of the optically active surface(s), that is to say in one setting. Subsequent rounding is likewise possible. In the latter case, a milling tool with a run-up roller, such as for example a polycrystalline diamond multi-point milling cutter (abbreviation: PCD multi-point milling cutter) with a run-up roller, is especially suitable.

Finally proposed is a method of coating a spectacle lens semi-finished or finished product with a front surface, a rear surface, a cylinder rim surface, a front edge surface with a front surface transition to the front surface and a front cylinder rim surface transition to the cylinder rim surface and/or a rear edge surface with a rear surface transition to the rear surface and a rear cylinder rim surface transition to the cylinder rim surface, comprising the method step of:

wet coating the spectacle lens semi-finished or finished product, which according to the invention is characterized in that before the wet coating, the front surface transition is provided with a rounding and/or, before the wet coating, the rear surface transition is provided with a rounding and the spectacle lens semi-finished or finished product with the front surface transition formed as a rounding and/or with the rear surface transition formed as a rounding is wet-coated.

Before the wet coating means in this connection that the spectacle lens semi-finished or finished product to be coated already has the corresponding rounding(s). These may have been introduced already during the casting or injection-molding of the blanks by a corresponding shaping of the molding shells or casting shells, during the surface working of the optical surface(s) or subsequently, after casting/injection molding and optical surface working, by corresponding finishing of the blanks with a suitable abrasive tool.

The invention accordingly teaches the use of a spectacle lens semi-finished or finished product with rounded edges, described at the beginning, in the wet coating for the purpose of the application of a functional layer.

BRIEF DESCRIPTION OF THE DRAWINGS

The invention will now be described with reference to the drawings wherein:

FIG. 2 shows working the rim of a spectacle lens semi-finished product with the aid of a multi-point milling cutter with a run-up roller to produce a rounding according to the invention at the transition between the front surface and the cylinder rim surface;

FIG. 3 shows a first variant of a surface working of one of the optically active surfaces to achieve the desired dioptric effect of the spectacle lens and of the edges to produce roundings according to the invention at the transitions between the optically active surfaces and the cylinder rim surface;

FIG. 4 shows a second variant of a surface working of one of the optically active surfaces to achieve the desired dioptric effect of the spectacle lens and of the edges to produce roundings according to the invention at the transitions between the optically active surfaces and the cylinder rim surface;

FIG. 5a shows the finished product dips into the dipping bath;

FIG. 5b shows the finished product is pulled out from the dipping bath; and,

FIG. 5c shows the finished product has left the dipping bath; and,

FIGS. 6a to 6f show various spectacle lenses according to the invention in a spin coating process:

FIG. 6a shows the rear surface coating of a plus lens;

FIG. 6b shows the rear surface coating of a minus lens;

FIG. 6c shows the front surface coating of a semi-finished product with a base curve of 0.5 dpt;

FIG. 6d shows the front surface coating of a semi-finished product with a base curve of 12 dpt;

FIG. 6e shows the front surface coating of a plus lens; and,

FIG. 6f shows the front surface coating of a minus lens.

DESCRIPTION OF THE PREFERRED EMBODIMENTS OF THE INVENTION

Figure 1A:
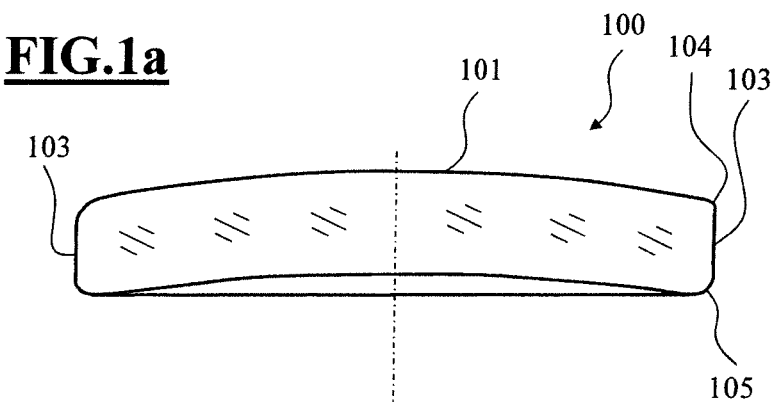
FIG. 1*a* shows a spectacle lens semi-finished product according to the invention (cross section)
Figure 1B:
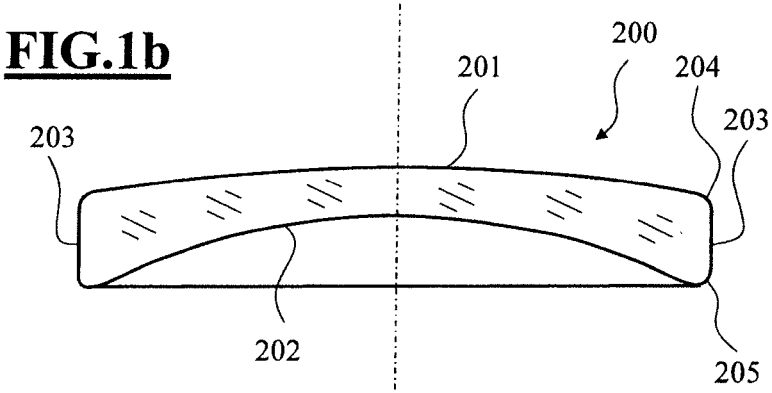
FIG. 1*b* shows a finished product of a minus spectacle lens according to the invention (cross section)
Figure 1C:
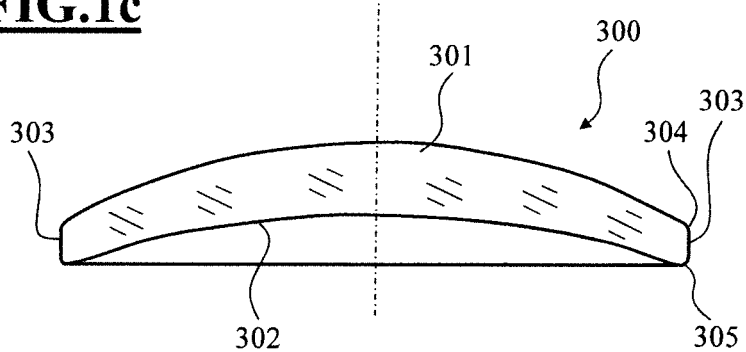
FIG. 1*c* shows a finished product of a plus spectacle lens according to the invention (cross section)
Figure 1D:
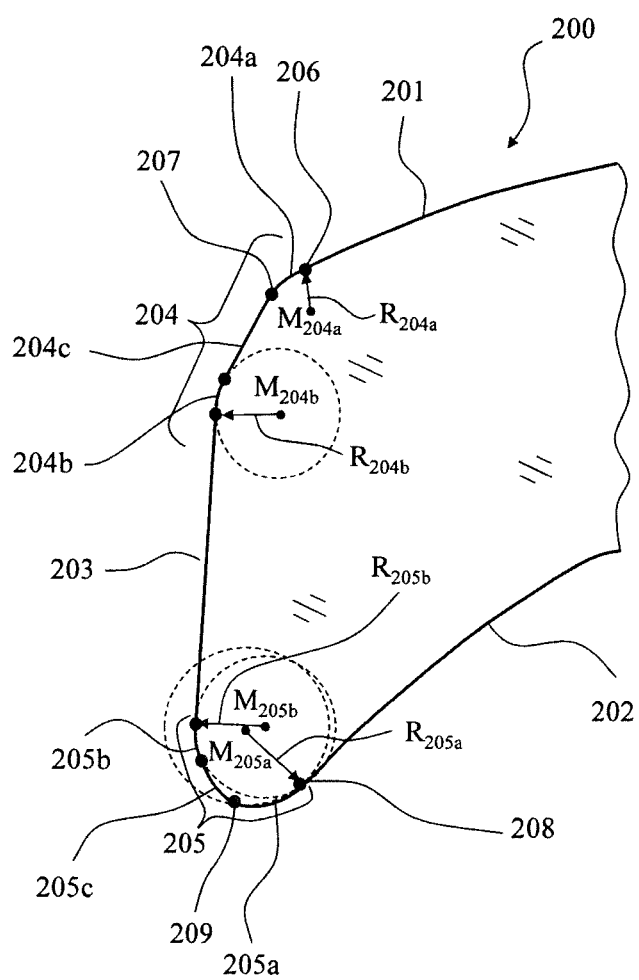
FIG. 1*d* shows a detail of the finished product as shown in FIG. 1*b* in an enlarged representation.

FIG. 1a shows a spectacle lens semi-finished product 100 according to the invention in cross section, FIG. 1b shows a finished product of a minus spectacle lens 200 according to the invention in cross section and FIG. 1c shows a finished product 300 of a plus spectacle lens according to the invention in cross section. FIG. 1d shows a detail of the finished product 200 as shown in FIG. 1b in an enlarged representation.

The (semi-)finished products 100, 200, 300 respectively have a convex front surface 101, 201, 301, a concave rear surface 102, 202, 302 and a circular-cylindrical cylinder rim surface 103, 203, 303. In the case of all three products 100, 200, 300, the convex front surface 101, 201, 301 already has the final curvature. This curvature is therefore no longer changed during the subsequent process steps. This front surface 101, 201, 301 therefore already has the desired refractive index for visible light.

The semi-finished product 100 has a concave rear surface 102, which has not yet been provided with the final curvature. This rear surface 102 is only provided with the final curvature in a further, usually abrasive process. In the case of the finished products 200, 300, the rear surfaces 202, 302 also have the final curvature, to achieve the desired dioptric effect of the spectacle lens 200, 300. Shaping working is no longer intended.

In the case of all three products 100, 200, 300, there are surfaces 204, 205 that are neither assigned to respective front and rear surfaces 101, 102, 201, 202, 301, 302 to achieve the desired dioptric effect nor belong to the respective cylinder rim surface 103, 203, 303. These surfaces 104, 105, 204, 205, 304, 305 are referred to hereinafter as edge surfaces 104, 105, 204, 205, 304, 305. They correspond to the bevel surfaces, that is to say the beveled surfaces of conventional semi-finished or finished products.

The edge surface 104, 204, 304 connecting the front surface 101, 201, 301 to the cylinder rim surface 103, 203, 303 is referred to hereinafter as the front edge surface 104, 204, 304, the edge surface 105, 205, 305 connecting the rear surface 102, 202, 302 to the cylinder rim surface 103, 203, 303 is referred to hereinafter as the rear edge surface 105, 205, 305.

The front edge surface 104, 204, 304 has a front surface transition 204a to the front surface 101, 201, 301 and a front cylinder rim surface transition 204b to the cylinder rim surface 103, 203, 303. The rear edge surface 105, 205, 305 has a rear surface transition 205a to the rear surface and a rear cylinder rim surface transition 205b to the cylinder rim surface 103, 203, 303. These transitions 204a, 204b, 205a, 205b are merely identified by reference signs in FIG. 1d of the drawing.

The front surface transition 204a is formed according to the invention as a rounding. Furthermore, the rear surface transition 205a is also formed in the way according to the invention as a rounding. In the cross section shown, the form of the respective rounding may for example describe a portion of a circle, a portion of an ellipse or a portion of a parabola or some other contour curved in one direction. All that is important is the stepless and smooth (inflection-free) transition of the respective optically active surface 201, 202 to the bevel surface 204, 205. The rounding 204a, 205a may be very small and have a radius of curvature R of 0.2 mm or—if there is sufficient clearance—be up to R=3 mm. In FIG. 1d of the drawing, the radius of curvature of the front surface transition 204a is identified by the reference sign $R_{204a}$ and of the rear surface transition 205a is identified by the reference sign $R_{205a}$.

In the present exemplary embodiment, the rounding of the front surface transition 204a extends over an angle $\alpha_{204a}$—measured with respect to the center point of curvature $M_{204a}$, defined above, starting from the point 206 on the edge between the front surface 201 and the edge surface 204 and extending up to the point 207 at which the curvature disappears and continuing in a linear portion 204c—which is approximately 35°. In the present exemplary embodiment, the rounding of the rear surface transition 205a extends over an angle $\alpha_{205a}$—measured with respect to the center point of curvature $M_{205a}$, defined above, starting from the point 208 on the edge between the rear surface 202 and the edge surface 205 and extending up to the point 209 at which the curvature disappears and continuing in a linear portion 205c—which is approximately 40°.

The respective transition 204b, 205b at the cylinder rim 203 is of secondary importance, but should if possible also be stepless and without any inflection, as shown by way of example in FIG. 1d of the drawing. These radii of curvature $R_{204b}$, $R_{205b}$ are also preferably in the range between 0.2 mm and 3 mm. In the exemplary embodiment, the corresponding angle ranges over which the roundings 204b, 205b extend are in turn 35° and 40°.

In the ideal case, the roundings extend over the entire edge surfaces that connect the front surface to the cylinder rim surface and the cylinder rim surface to the rear surface. It should be pointed out that in this case a line of intersection of the edge surface with a plane passing through the center axis of the cylinder rim has no points of inflection. Accordingly, with respect to the center point of curvature of the front surface transition on the one hand and with respect to the center point of curvature of the rear surface transition on the other hand, the roundings generally extend over angle ranges that are in the range between 85° and 110°.

The roundings described above, in particular the roundings last described, which extend over the entire edge surfaces (bevel surfaces), may be produced subsequently with the aid of a suitable milling tool. FIG. 2 shows by way of example such working of the rim of a spectacle lens semi-finished product 400 with the aid of a multi-point milling cutter 410 with a run-up roller 411.

FIG. 2 in turn reveals the characteristic component parts of the spectacle lens semi-finished product 400, to be specific the finished convex front surface 401, the rear surface 402 and the cylinder rim surface 403.

The figure of the drawing also reveals the main component parts of the multi-point milling cutter 410, to be specific the diamond cutters 412a, 412b, 412c, which are provided on a cutter head 413, a spindle 414, which carries the cutter head 413 with the diamond cutters 412a, 412b, 412c and can be driven in a rotating manner, and the run-up roller 411, which is rotatably mounted underneath the cutter head 413 as an extension of the spindle 414.

To provide the roundings, the semi-finished product 400 is driven in a rotating manner about its rim-cylinder center axis $A_{403}$ and the cutter head 413 is driven in a rotating manner about the spindle center axis $A_{414}$. The rotational movements are identified in the drawing by the reference signs $\overline{\omega}_{414}$ and $\overline{\omega}_{400}$.

With the aid of FIG. 3, a description is given of a first variant of the surface working of the front surface 501 of a semi-finished product 500 with a prefabricated rear surface 502 to achieve the desired dioptric effect of the spectacle lens and a working of the edge 504 between the front surface 501 and the cylinder rim surface 503 and the edge 505 between the rear surface 502 and the cylinder rim surface 503 to produce roundings 506, 507 according to the invention at the transitions between the optically active surfaces 501, 502 and the cylinder rim surface 503. The working is performed with the aid of a high-speed cutting machine, as described for example in U.S. Pat. No. 6,523,443 or sold by Schneider GmbH and Co. KG under the product group designation HSC. The working tool comprises a diamond tip 510, which is guided spirally from outside toward the center of the respective optical surface, and thereby performs movements back and forth to achieve the desired curvature. A more detailed description can be taken for example from the aforementioned publication U.S. Pat. No. 6,523,443.

FIG. 3 reveals the semi-finished product 500 in half-section and the diamond tip 510 at various positions on the semi-finished product 500. The semi-finished product 500 is driven rotatably about the rim-cylinder center axis $A_{503}$ at the angular velocity $\overline{\omega}_{500}$. While the semi-finished product 500 is rotating at a speed of several thousand revolutions per minute, the diamond tip 510 is guided radially outwardly, performing a reciprocating movement 511 in the direction of the rim-cylinder center axis $A_{503}$, starting from a point 509 lying at the rim 508 of the rear surface 502. To produce the rounding 507, during the initially radial movement 512 of the tool the infeeding direction of the diamond tip 510 is adjusted in such a way that the infeed angle β in relation to the normal to the surface to be achieved always remains between 0 and 30°. The initially radial movement 512 of the tool 510 goes over at the cylinder rim 503 into a movement 512, 513 in the direction of the rim-cylinder center axis $A_{503}$, before it goes over into an inward radial movement 513, with adjustment of the infeed angle β, in the region 514 of the end on the front surface side of the rim cylinder surface 503 to produce the rounding 506. After that, the front surface 501 is then worked with the diamond tool 510 in a way known per se.

FIG. 4 reveals a second variant of a surface working of the optically effective front surface 601 of a semi-finished product 600 to achieve the desired dioptric effect of the spectacle lens and of the edges 604, 605 of the semi-finished products 600 to produce the roundings 606, 607 according to the invention at the transitions between the optically active surfaces 601, 602 and the cylinder rim surface 603.

As a difference from the variant of the embodiment that is represented in FIG. 3, a diamond milling cutter 610 is used as the working tool. The diamond milling cutter 610 has a cutter head 611, which can be driven rotatably about its center axis $A_{611}$ at the angular velocity $\overline{\omega}_{611}$ and has four diamond cutters 612a, 612b, 612c, 612d.

As in the exemplary embodiment above, the semi-finished product 600 is driven rotatably about its rim-cylinder center axis $A_{603}$ at the angular velocity $\overline{\omega}_{600}$. While the semi-finished product 600 is rotating at the angular velocity $\overline{\omega}_{600}$ of several thousand revolutions per minute, the diamond milling cutter 610 is guided radially outwardly, starting from a point 609 lying at the rim 608 of the rear surface 602, then along the cylinder rim surface 603 and finally radially inwardly again. The directions of movement of the diamond cutter 610 are indicated in the drawing with the aid of the arrows identified by the reference signs 613, 614.

Figure 5A:
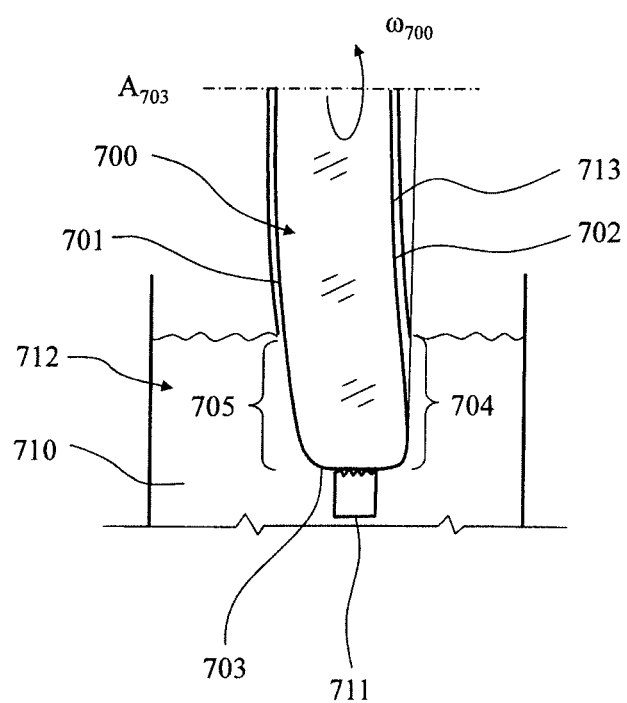
FIGS. 5*a* to 5*c* show a finished product according to the invention during various phases of a dip coating process (schematic cross-sectional representation)
Figure 5B:
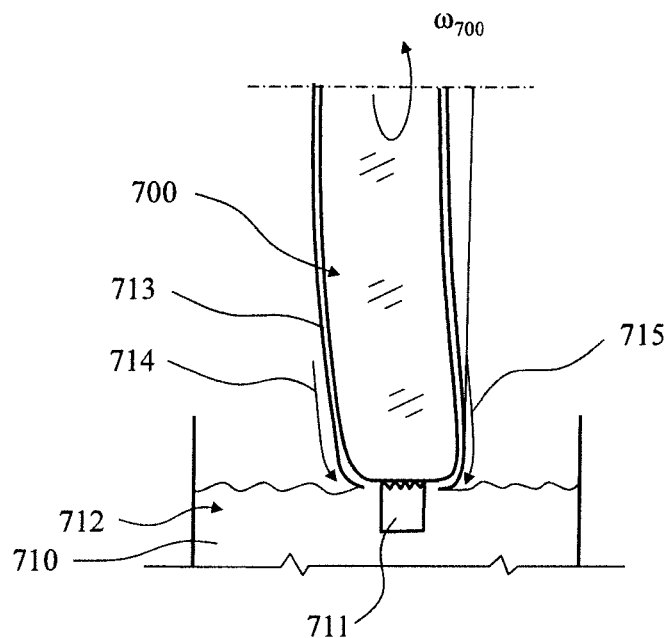
Figure 5C:
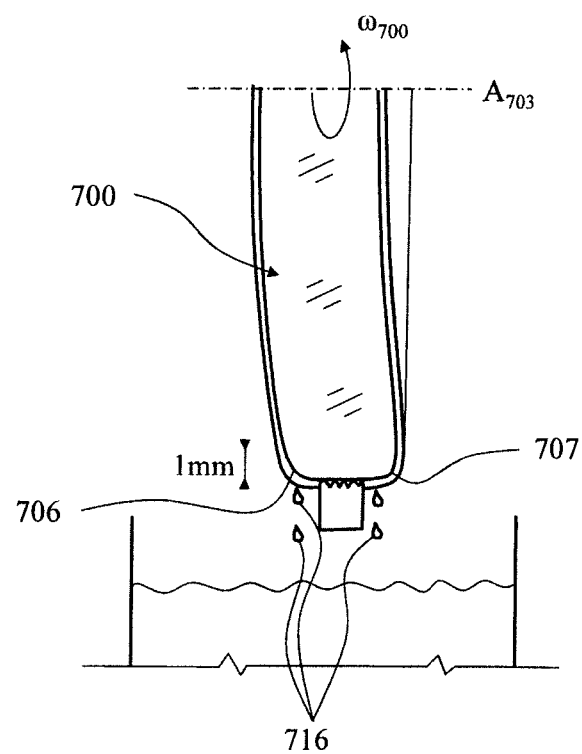

FIGS. 5a to 5c show a finished product 700 according to the invention during various phases of a dip coating process in a schematic cross-sectional representation. FIG. 5a shows the finished product 700 dipped into the dipping bath 710. The finished product 700 is held on its cylinder rim surface 703 by a clamp 711. The finished product 700 is driven rotatably about its rim-cylinder center axis $A_{703}$ at the angular velocity $\overline{\omega}_{700}$. At the same time, a wetting with coating 712 of the regions 704, 705 of the front surface 701 and of the rear surface 702 dipping into the dipping bath 710 takes place. On account of the rotational movement $\overline{\omega}_{700}$ of the finished product 700, the coating 712 is distributed over its entire front and rear surfaces 701, 702 and forms a film of coating 713 there.

If the finished product 700 is pulled out from the dipping bath 710, as shown in FIG. 5b, the film of coating 713 flows in the direction of the dipping bath 710 on account of centrifugal and gravitational force, as is indicated with the aid of the arrows 714, 715.

If, as shown in FIG. 5c, the finished product 700 is pulled out completely from the dipping bath 710, the excess coating 716 will drip off back into the dipping bath 710. The transition 706, 707, rounded according to the invention, between the optical surfaces 701, 702 and the cylinder rim surface 703 is conducive to the running-off behavior so positively that no accumulation of coating remains on the respective optical surface 701, 702 and the usable diameter becomes greater.

Figures 6A, 6B:
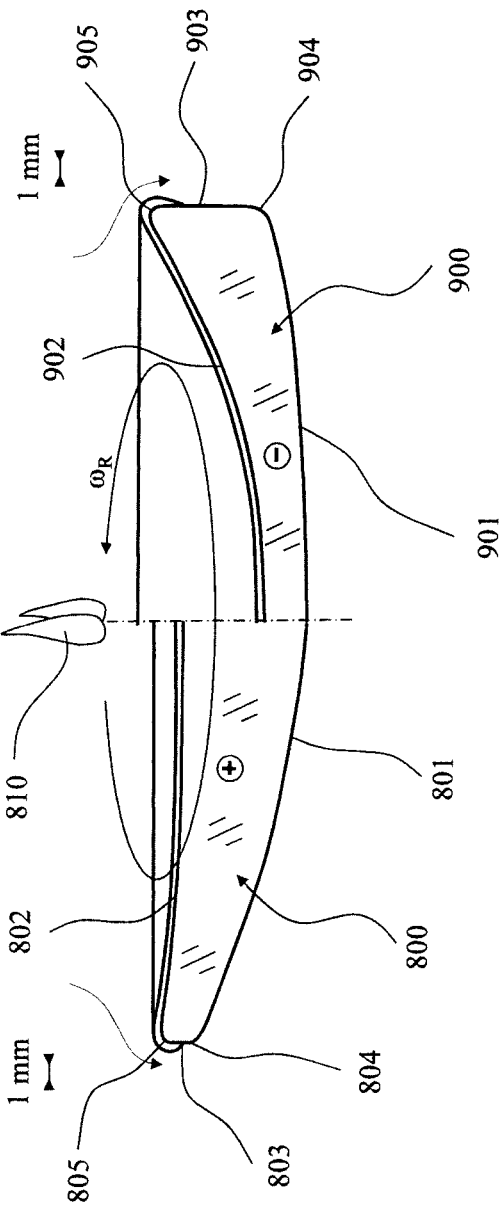

FIGS. 6a to 6f show various spectacle lenses 800, 900, 1000, 1100, 1200, 1300 according to the invention in a spin coating process. FIG. 6a shows a rear surface coating of a plus lens 800. FIG. 6b shows a rear surface coating of a minus lens 900. FIG. 6c shows a front surface coating of a semi-finished product 1000 with a base curve of 0.5 dpt. FIG. 6d shows a front surface coating of a semi-finished product 1100 with a base curve of 12 dpt. FIG. 6e shows a front surface coating of a plus lens 1200 and FIG. 6f shows a front surface coating of a minus lens 1300.

The spectacle lenses 800, 900, 1000, 1100, 1200, 1300 are driven rotatably at the angular velocity $\overline{\omega}_R$. A coating 810 is fed centrally onto the upper-lying surface 802, 902, 1001, 1101, 1201, 1301 and, as a result of the rotational movement, is distributed over the entire surface area and runs off over the respective cylinder rim surface 803, 903, 1003, 1103, 1203, 1303. As shown in FIGS. 6a and 6b, the rotational speed $\overline{\omega}_R$ is chosen in the case of the rear-side coating to be great enough that the centrifugal force prevents any flowing back to the middle of the rear surface.

All of the spectacle lenses 800, 900, 1000, 1100, 1200, 1300 have roundings 804, 805, 904, 905, 1004, 1005, 1104, 1105, 1204, 1205, 1304, 1305 at the transitions between their front surfaces 801, 901, 1001, 1101, 1201, 1301 and their cylinder rim surfaces 803, 903, 1003, 1103, 1203, 1303 and also between their rear surfaces 802, 902, 1002, 1102, 1202, 1302 and their cylinder rim surfaces 803, 903, 1003, 1103, 1203, 1303 that extend approximately 1 mm into the respectively optically effective surface 801, 901, 1001, 1101, 1201, 1301, 802, 902, 1002, 1102, 1202, 1302. This rounded transition 804, 805, 904, 905, 1004, 1005, 1104, 1105, 1204, 1205, 1304, 1305 is conducive to the spinning-off behavior so positively that rotational speeds $\overline{\omega}_R$ can be increased by a multiple and no breakaway of coating (flying droplets) occurs, but instead the accumulation of coating is transported smoothly to the rounded transition 804, 805, 904, 905, 1004, 1005, 1104, 1105, 1204, 1205, 1304, 1305 and to the cylinder rim 803, 903, 1003, 1103, 1203, 1303. Less or no accumulation of coating is left on the optical surface 802, 902, 1001, 1101, 1201, 1301 and the usable diameter becomes greater.

It is understood that the foregoing description is that of the preferred embodiments of the invention and that various changes and modifications may be made thereto without departing from the spirit and scope of the invention as defined in the appended claims.

The invention claimed is:

1. A spectacle lens semi-finished product or spectacle lens finished product comprising:
    a front surface;
    a rear surface;
    a cylinder rim surface;
    a front edge surface having a front surface transition to said front surface and a front cylinder rim surface transition to said cylinder rim surface; and/or, a rear edge surface having a rear surface transition to said rear surface and a rear cylinder rim surface transition to said cylinder rim surface; and,
    said front surface transition being configured as a rounding; and/or, said rear surface transition being configured as a rounding, wherein:
    said rounding of said front surface transition has a radius of curvature ($R_{204a}$) greater than 1.0 mm; and/or,
    said rounding of said rear surface transition has a radius of curvature ($R_{205a}$) greater than 1.0 mm.

2. The spectacle lens semi-finished product or spectacle lens finished product of claim 1, wherein:
    said rounding of said front surface transition has a radius of curvature ($R_{204a}$) which is less than 5.0 mm; and/or,
    said rounding of said rear surface transition has a radius of curvature ($R_{205a}$) of less than 5.0 mm.

3. The spectacle lens semi-finished product or spectacle lens finished product of claim 1, wherein:
    said rounding of said front surface transition has a radius of curvature ($R_{204a}$) which is less than 3.0 mm; and/or,
    said rounding of said rear surface transition has a radius of curvature ($R_{205a}$) of less than 3.0 mm.

4. The spectacle lens semi-finished product or spectacle lens finished product of claim 1, wherein:
    said rounding of said front surface transition has a radius of curvature ($R_{204a}$) which is less than 2.5 mm; and/or,
    said rounding of said rear surface transition has a radius of curvature ($R_{205a}$) of less than 2.5 mm.

5. The spectacle lens semi-finished product or spectacle lens finished product of claim 1, wherein:
    said rounding of said front surface transition has a radius of curvature ($R_{204a}$) which is less than 2.0 mm; and/or,
    said rounding of said rear surface transition has a radius of curvature $R_{205a}$) of less than 2.0 mm.

6. The spectacle lens semi-finished product or spectacle lens finished product of claim 1, wherein:
    said rounding of said front surface transition extends over an angle ($\alpha_{204a}$) greater than 15°; and/or,
    said rounding of said rear surface transition extends over an angle ($\alpha_{205a}$) greater than 25°.

7. The spectacle lens semi-finished product or spectacle lens finished product of claim 1, wherein:
    said rounding of said front surface transition extends over an angle ($\alpha_{204a}$) greater than 20°; and/or,
    said rounding of said rear surface transition extends over an angle ($\alpha_{205a}$) greater than 30°.

8. The spectacle lens semi-finished product or spectacle lens finished product of claim 1, wherein:
    said rounding of said front surface transition extends over an angle ($\alpha_{204a}$) greater than 25°; and/or,
    said rounding of said rear surface transition extends over an angle ($\alpha_{205a}$) greater than 35°.

9. The spectacle lens semi-finished product or spectacle lens finished product of claim 1, wherein:
    said rounding of said front surface transition extends over an angle ($\alpha_{204a}$) greater than 30°; and/or,
    said rounding of said rear surface transition extends over an angle ($\alpha_{205a}$) greater than 40°.

10. The spectacle lens semi-finished product or spectacle lens finished product of claim 1, wherein said front cylinder rim surface transition is configured as a rounding and/or said rear cylinder rim surface transition is configured as a rounding.

11. A method of making a spectacle lens semi-finished product or spectacle lens finished product, the product including:
    a front surface;
    a rear surface;
    a cylinder rim surface;
    a front edge surface having a front surface transition to said front surface and a front cylinder rim surface transition to said cylinder rim surface; and/or, a rear edge surface having a rear surface transition to said rear surface and a rear cylinder rim surface transition to said cylinder rim surface;
    the method comprising the steps of:
    imparting a rounding to said front surface transition; and/or,
    imparting a rounding to said rear surface transition,
    wherein said rounding of said front surface transition and/or said rounding of said rear surface transition is integrally cast.

12. The method of claim 11, wherein said front cylinder rim surface transition is provided with a rounding and/or said rear cylinder rim surface transition is provided with a rounding.

13. A method of making a spectacle lens semi-finished product or spectacle lens finished product, the product including:
    a front surface;
    a rear surface;
    a cylinder rim surface;
    a front edge surface having a front surface transition to said front surface and a front cylinder rim surface transition to said cylinder rim surface; and/or, a rear edge surface having a rear surface transition to said rear surface and a rear cylinder rim surface transition to said cylinder rim surface;
    the method comprising the steps of:
    imparting a rounding to said front surface transition and/or imparting a rounding to said rear surface transition; and, thereafter, wetting said product having said front surface transition and/or said product having said rear surface transition,
    wherein said rounding of said front surface transition and/or said rounding of said rear surface transition is integrally cast.

* * * * *